UNITED STATES PATENT OFFICE.

HARRY W. CHARLTON, OF JONESPOINT, NEW YORK.

BRICKS AND OTHER MOLDED ARTICLES.

1,249,028.     Specification of Letters Patent.     Patented Dec. 4, 1917.

No Drawing.     Application filed April 28, 1917. Serial No. 165,183.

*To all whom it may concern:*

Be it known that I, HARRY W. CHARLTON, a citizen of Canada, residing at Jonespoint, in the county of Rockland, State of New York, have invented certain new and useful Improvements in Bricks and other Molded Articles; and I do hereby declare the following to be a full, clear, and exact description of the invention, such as will enable others skilled in the art to which it appertains to make and use the same.

This invention relates to new and useful improvements in bricks, artificial marble, artificial stone, terra cotta, floor and roof tile, monuments, electrical insulators and the like; and it comprises a novel method of producing such products and the novel bricks and like products produced thereby.

The bricks and like products of the present invention are made from a cementing material resulting from the digestion with lime (or its equivalent, *e. g.*, dolomitic lime, or lime and calcium carbonate or lime and alkali—sodium or potassium—salts) of a silicate material, combined with rock material and more particularly with sand, as will be more fully hereinafter described.

When feldspar, leucite, potash mica, greensand, or like alkali silicate, in a finely ground condition, is digested with lime in the presence of water, under a suitable pressure and at a corresponding temperature, for a sufficient period of time, the greater portion of the potash is liberated and goes into solution. There remains as a residue, a hydrated cementing material of a nature adapting it particularly for use in the production of bricks and like products.

The hydrated or hydrous material thus produced has remarkable moisture retaining properties, being capable of retaining as much as 50% or more of water when moist, and containing, when dry, about twelve to fifteen per cent. of water of combination. So also, when so dried at a temperature slightly over 100°, it forms a perfectly dry powder containing up to about fourteen or fifteen per cent. of water of combination, and is then capable, when subjected to pressure, of being reduced to two-thirds or one-half its volume.

Such hydrous materials are utilized, according to the present invention, for the production of brick and other products such as those above mentioned. To this end the material is mixed with sand or other suitable rock material and the mixture molded and compressed into the desired shape and then subjected to a steaming operation.

The invention will be further illustrated by the following more detailed description of certain embodiments thereof.

From thirty to sixty parts of finely ground feldspar are digested with from sixty to thirty parts of lime, (or lime and calcium carbonate, or lime and sodium and potassium salts) and with from three hundred to five hundred parts of water, at a pressure above about two hundred pounds, and at a temperature of about 160 to 200° C., for a period of from two to four hours. As the result of the reaction which takes place during this digestion, the greater portion of the potash is liberated and goes into solution, leaving as a residue, a white solid which is filtered off and well washed and dried at a temperature slightly above 100° C. The white solid thus separated is a hydrous or hydrated amorphous material, containing considerable amounts of water which are removed during the drying operation. After filtering by the ordinary methods, and before drying, it usually contains from forty to sixty per cent. of water. When dried at about 110° C. it still retains frequently as much as fifteen per cent. water of combination. This material, when so dried, can be easily compressed to nearly half its original volume.

Microscopic study of the material obtained by digestion of feldspar with lime shows it to be of an amorphous nature, with some crystalline material and residual feldspar. Soluble silica is obtainable from it with ease by treatment with dilute alkalis. Its action during subsequent hardening indicates that in chemical composition it is a somewhat complex substance which probably contains as its principal constituents silicate of lime and aluminates of lime and of the alkalis.

The reaction which takes place during digestion of feldspar with lime involves a breaking down of the insoluble silicate, feldspar, with the probable formation of easily hydrolized silicates and aluminates, chiefly the former, of lower silicate ratio. These are in part at least amorphous, and very easily decomposable.

The following is an illustration of the composition of the cementing material obtained from feldspar.

| | |
|---|---|
| Silica | 32.53 per cent. |
| Alumina | 11.02 " |
| Calcium oxid | 35.55 " |
| Loss on ignition | 13.91 " |

This cementing material, when mixed with sand or other suitable rock material, even in a fairly coarse state of division, possesses remarkable cementing properties when subjected to steam pressure, yielding a hardened or set mass.

In manufacturing bricks or other hardened or set masses of any desired form and for various purposes, the cementing material is intimately mixed with sand in proportions ranging from two to fifty per cent. of the cementing material. It is found that a brick of fair hardness results when but seven per cent. of the cementing material is used. After thorough mixture, the mass is molded or compressed and then subjected to a steaming operation. A suitable pressure is thus about two to seven tons per square inch of surface and the steaming is then usually carried on for a period of eight to fifteen hours at a steam pressure of from about a hundred to a hundred and fifty pounds for a period of from eight to fifteen hours.

Owing to the soft and plastic nature of the amorphous cementing material it is uniformly distributed around and among the sand grains so that they are inclosed in a compact matrix, and so that the contacts between the sand grains and matrix are continuous and complete. The matrix is made up largely of amorphous material surrounding the sand grains, and extending irregularly through the matrix, and consists largely of hardened or set silicate cementing material. Crystallized hydrate of lime also occurs in the matrix, away from the sand grains and surrounded by and to some extent mingled with the amorphous material. Also embedded in the matrix and inclosed in the amorphous material, are unaltered fine feldspar grains which fill in between the sand grains and also serve as an anchorage for the cement, thus strengthening the bond.

The general result of the hardening process seems to be the development of the compact tightly adhering amorphous silicate material as a strong hardened bond, and a marked development and coarsening of the calcium hydrate, the latter process adding strength to the structure as a whole.

The bricks and other products produced as above described moreover possess unusual hardness, and, when made from the amorphous cementing material derived from feldspar, are usually snow white in color and resemble marble in appearance, and, when made from the material derived from green sand, are green in color. The molded products moreover present sharp and firm edges. Small amounts of impurities do not seem to interfere with the snow white color of the products made with the cementing material derived from feldspar, but bricks and other molded products of various delicate shades of color or even of pronounced shades of color, or mottled effects, if desired, can be produced by adding iron or other salts before the molding and steaming operation, e. g., by adding the product obtained by digestion of green sand with lime and subsequent calcination, to give a buff-colored product. The final products often have a smooth translucent surface and a clear china-like ring. They are characterized by their resistances to the corroding action of air and water and are hence adapted for use in place of terra cotta, floor and roof tile, porcelain and various other materials and products. If very high pressure is employed in the production of these products they resemble granite in hardness and may be employed in monumental work or for various other purposes where hardness and resistance to the elements is an important feature.

In place of sand, other suitable rock materials can be used with the hydrous cementing material in the production of bricks or other products. Even sea sand has been found suitable for use in connection with this amorphous cementing material in the production of brick, since it has been found that the salt accompanying the sea sand does not interfere with the bonding properties of the material. This is the more remarkable because of many unsuccessful attempts to use sea sand with lime in the production of so-called sand-lime brick where the salt has been found to interfere with the bonding properties and to give very weak bricks. Another objection to the use of sea sand in the production of the sand-lime bricks has been the pronounced efflorescence caused thereby. No objectionable efflorescence has been noted when sea sand has been used with the hydrous material in the production of bricks according to the present invention.

The present invention involves a steaming or hardening operation, in the production of bricks and other articles, similar to that used in the production of the so-called sand-lime bricks; but the utilization of the hydrous cementing material in the production of bricks and the like, according to the present invention, presents very material advantages as compared with the utilization of lime with sand, according to present practice, in the production of the sand-lime bricks.

According to the present invention, the amorphous cementing material is developed largely from the added cementing material, whereas in the common sand-lime brick manufacture the cementing action is dependent upon the reaction between the sand and lime during the hardening action. The amorphous cementing material used according to the present invention is itself a cement in character which hardens and thus intensifies the cementing action. The products of the present invention are accordingly distinguished from the so-called sand-lime bricks in being bound together in a new and characteristic manner by a material which is itself of the nature of a cement, and which itself has distinctive and valuable and characteristic properties.

While the invention has been more particularly described in connection with the utilization of a hydrous and amorphous cementing material derived from feldspar, yet it will be understood that other like silicates can be similarly treated to produce similar hydrous cementing materials and that even other material than alkali aluminum silicates (such as feldspar, leucite, etc.) such, e. g., as clay, can be utilized as the source of the hydrous cementing material, when they have been subjected to a proper treatment. The hydrous material produced from feldspar has, however, been found to possess valuable characteristics which adapt it particularly for use in the manner described, and especially where snow white bricks and other products are desired. So also, while other rock materials than sand can be used with the cementing material to produce bricks and other products, sand has been found particularly valuable for this purpose, since products of greater strength result when it is used, some characteristic combination appearing to take place between the hydrous cementing material and the sand particles.

When the hydrous cementing material is derived from an alkali silicate, such as feldspar and the like, by digestion with lime, and with resulting solution and removal of usually the major portion of the potash, there nevertheless remains in the hydrous cementing material some small amounts of undecomposed feldspar and of unextracted potash which vary somewhat in practice. When the hydrous material is thus produced and contains such small amounts of feldspar and potash, the final molded product will be similarly characterized by containing similar or corresponding amounts of feldspar and of potash or other alkali. This feldspar, however, does not appear to be prejudicial but rather advantageous when the hydrous cementing material is utilized according to the present invention for the production of bricks and other products.

I claim:

1. The method of making bricks and other molded articles, which comprises forming a molded mass of rock material and a cementing material obtained by digestion of silicate material with lime, and subjecting the molded mass to a steaming operation.

2. The method of making bricks and other molded articles, which comprises forming a molded mass of sand and a cementing material obtained by digestion of silicate material with lime, and subjecting the molded mass to a steaming operation.

3. The method of making bricks and other molded articles, which comprises forming a molded mass of rock material and a cementing material obtained by digestion of an alkali aluminum silicate with lime, and subjecting the molded mass to a steaming operation.

4. The method of making bricks and other molded articles, which comprises forming a molded mass of sand and a cementing material obtained by digestion of an alkali aluminum silicate with lime, and subjecting the molded mass to a steaming operation.

5. The method of making bricks and other molded articles, which comprises forming a molded mass of rock material and a cementing material obtained by digestion of feldspar with lime, and subjecting the molded mass to a steaming operation.

6. The method of making bricks and other molded articles, which comprises forming a molded mass of sand and a cementing material obtained by digestion of feldspar with lime, and subjecting the molded mass to a steaming operation.

7. As new articles of manufacture, steam hardened bricks and other molded articles, comprising rock material and a cementing material obtained by digestion of silicate material with lime.

8. As new articles of manufacture, steam hardened bricks and other molded articles, comprising sand and a cementing material obtained by digestion of silicate material with lime.

9. As new articles of manufacture, steam hardened bricks and other molded articles, comprising rock material and a cementing material obtained by digestion of an alkali aluminum silicate with lime.

10. As new articles of manufacture, steam hardened bricks and other molded articles, comprising sand and a cementing material obtained by digestion of an alkali aluminum silicate with lime.

11. As new articles of manufacture, steam hardened bricks and other molded articles, comprising rock material and a cementing material obtained by digestion of feldspar with lime.

12. As new articles of manufacture, steam hardened bricks and other molded articles, comprising sand and a cementing material obtained by digestion of feldspar with lime.

In testimony whereof I affix my signature.

HARRY W. CHARLTON.